(12) United States Patent
Haley et al.

(10) Patent No.: US 6,588,179 B2
(45) Date of Patent: Jul. 8, 2003

(54) METHOD AND APPARATUS FOR PACKAGING AN AIRBAG

(75) Inventors: John W Haley, Dayton, OH (US); David Lee Anspach, Waynesville, OH (US); Mike P Gonzalez, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/944,479

(22) Filed: Aug. 31, 2001

(65) Prior Publication Data

US 2003/0045418 A1 Mar. 6, 2003

(51) Int. Cl.[7] .............................................. B65B 63/04
(52) U.S. Cl. ..................... 53/429; 53/116; 493/450; 493/374; 280/473.1; 280/728.1
(58) Field of Search .................... 280/743.1, 728.1; 493/450, 940, 374; 53/429, 116

(56) References Cited

U.S. PATENT DOCUMENTS

| | | | | |
|---|---|---|---|---|
| 3,266,212 A | * | 8/1966 | Monroe, Jr. ................. 141/34 |
| 5,140,799 A | * | 8/1992 | Satoh ...................... 280/743.1 |
| 5,782,737 A | * | 7/1998 | Warner ........................ 493/314 |
| 5,791,682 A | * | 8/1998 | Hiramitsu et al. ........ 280/728.2 |
| 5,803,483 A | * | 9/1998 | Lunt ........................ 280/728.1 |
| 5,868,660 A | * | 2/1999 | Yokoyama ................... 493/405 |
| 5,960,611 A | * | 10/1999 | Aigner et al. ............... 493/405 |
| 5,984,852 A | * | 11/1999 | Heudorfer et al. ........ 280/728.1 |
| 6,115,998 A | * | 9/2000 | Reh et al. ..................... 53/429 |
| 6,171,228 B1 | * | 1/2001 | Marotzke et al. ......... 280/728.1 |
| 6,248,052 B1 | | 6/2001 | Kleeberger et al. ......... 493/374 |
| 6,260,330 B1 | | 7/2001 | Borowski et al. ............. 53/429 |
| 6,327,838 B1 | * | 12/2001 | Maul et al. ............... 280/728.1 |
| 2002/0089159 A1 | * | 7/2002 | Fischer et al. .............. 280/740 |

* cited by examiner

Primary Examiner—Rinaldi I. Rada
Assistant Examiner—Louis Tran
(74) Attorney, Agent, or Firm—Kathryn A. Marra (57) ABSTRACT

A method and apparatus for folding an inflatable air bag cushion within an air bag module cover. An open end of the air bag cushion is attached at a moveable holding fixture and a ram cylinder is extended through an opening in the holding fixture and into the air bag cushion. A moveable containment tunnel is passed in substantially surrounding relation over at least a portion of the air bag cushion and the holding fixture and ram cylinder are conveyed through the moveable containment tunnel and towards a base portion of the cover such that the air bag cushion is pressed together irregularly within a region bounded by a wall portion of the cover.

10 Claims, 9 Drawing Sheets

METHOD AND APPARATUS FOR PACKAGING AN AIRBAG

TECHNICAL FIELD

The invention relates to a method and apparatus for packaging an inflatable airbag cushion for use in transportation vehicles.

BACKGROUND OF THE INVENTION

It is well known to utilize inflatable air bag cushions to provide protection to vehicle occupants during a collision event. Such air bag cushions are deployed rapidly by the introduction of inflation gas upon the occurrence of predetermined vehicle conditions such as deceleration exceeding a certain level. In order to provide a cushioning barrier to the occupant to be protected, it is generally desired that the air bag unfold from a stored position in a rapid manner upon the introduction of the inflation gas. Thus, it is required that the air bag be folded in a manner to facilitate such rapid deployment. In addition, it is generally desirable for the folded air bag cushion to be stored in a relatively compact stored arrangement prior to activation.

Various equipment has been utilized to fold air bag cushions into compact arrangements which occupy little space in a stored condition prior to deployment but which nonetheless expand rapidly to an operable inflated condition upon introduction of the inflation gas. One folding apparatus which has been utilized has made use of paddles to create a series of substantially regular fan-type folds in the air bag cushion. An alternative apparatus is disclosed in U.S. Pat. No. 6,260,330 to Borowski et al. (incorporated by reference) which utilizes a walled housing in which the air bag cushion is folded by a number of cycles of increasing and decreasing pressure to achieve a desired folding arrangement. Still another folding apparatus is illustrated and described in U.S. Pat. No. 6,248,052 to Kleeberger et al. (incorporated by reference) wherein the air bag cushion is folded in a substantially irregular chaotic arrangement within an air bag module covering element.

SUMMARY OF THE INVENTION

In accordance with one potentially preferred embodiment and practice of the present invention, advantages and alternatives are provided over known folding practices and equipment by providing a folding method and apparatus for compacting an air bag cushion in a substantially chaotic folded arrangement within a cover element for an air bag module utilizing a controlled vacuum and/or enhanced pressurization within the interior of the air bag cushion during the folding operation and a moveable surrounding containment tunnel which may be moved into an operative position surrounding the air bag cushion above the cover element while also providing a channel for directing the air bag cushion into the cover element during the folding operation.

According to one potentially preferred folding practice, an air bag cover element is loaded into a nest support while an air bag cushion with attached base plate is loaded onto a moveable holding fixture arranged in opposing relation to the supported air bag cover element. A ram cylinder connected to a vacuum/compressor source is introduced through a central opening within the air bag base plate and into the interior of the air bag cushion to apply vacuum and/or pressurizing forces during selected periods of the folding operation. A vacuum is applied to collect the air bag cushion around the ram cylinder. A hollow containment tunnel in the form of a rodless cylinder or the like is thereafter lowered over the holding fixture in surrounding relation to the air bag cushion. The base plate holding fixture and containment tunnel are moved towards an opening in a working plate located between the holding fixture and the air bag cover element. The containment tunnel establishes a travel conduit through the working plate and feeding into the air bag cover element. The base plate holding fixture and ram cylinder continue to move through the containment tunnel thereby compressing the air bag cushion within the cover element until the air bag base plate engages attachment structures such as hook elements extending away from the walls of the air bag cover. The holding fixture then releases the air bag cushion and base plate assembly and the components of the folding apparatus return to their starting position.

In accordance with one potentially preferred practice, the ram cylinder may be pressed forward against the closed end of the air bag cushion prior to introduction of any vacuum so as to promote the substantially uniform distribution of air bag material around the ram cylinder. The closed end of the air bag is thereby held in tension along a folding axis defined by the extended ram cylinder during the folding process so that it defines a center about which the air bag cushion may be folded. The moveable containment tunnel further facilitates the maintenance of this generally central arrangement.

Due to the relative displacement of the various components within the folding apparatus, the loading of the air bag cushion and attached base plate and the air bag cover element may be performed in a highly efficient and reproducible manner. Further advantages and features of the present invention will become apparent through reference to the accompanying drawings and detailed description of the preferred embodiment of the invention as set forth below.

BRIEF DESCRIPTION OF THE DRAWINGS

The present invention will now be described, by way of example only, with reference to the accompanying drawings which form a part of this specification and in which.

While the invention has been illustrated and will hereinafter be described in connection with certain potentially preferred embodiments and procedures, it is to be understood that in no event is the invention to be limited to such illustrated and described embodiments and procedures. On the contrary, it is intended that the present invention shall extend to all alternatives and modifications to the illustrated and described embodiments and procedures as may embrace the broad principles of this invention within the true spirit and scope thereof

DESCRIPTION OF THE PREFERRED EMBODIMENT

Figure 1:
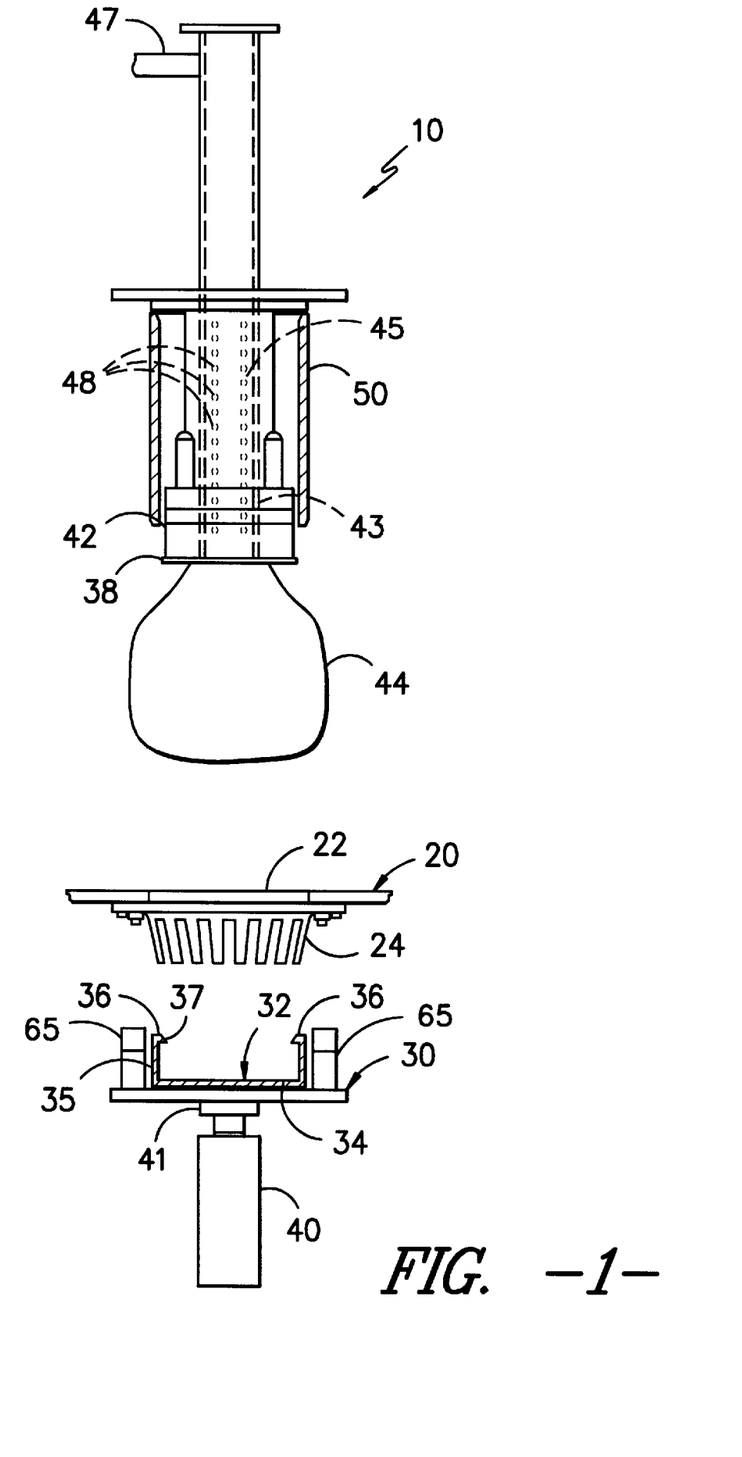
FIG. 1 is a side view of an embodiment of a folding apparatus upon attachment of an air bag cushion and base plate assembly to a moveable holding fixture and with an air bag cover element loaded within a moveable nest support.

Reference will now be made to the drawings wherein to the extent possible like reference numerals are utilized to designate like components throughout the various views. An embodiment of a folding apparatus 10 is illustrated in FIG. 1. As shown, the folding apparatus 10 includes a horizontally extending working plate 20 including a working plate opening 22 opening into a multi-finger guide channel element 24 extending away from the working plate 20 and towards a nest support element 30 which supports an air bag module cover element 32. As shown, the cover element 32 preferably includes a base portion 34 and an outwardly extending wall portion 35 connected to the base portion 34. The wall portion 35 preferably includes hook elements 36 including angled boss surfaces 37 arranged about the upper boundary to slide in clamping relation over the edges of an air bag base plate 38 to effect a fixed attachment between the cover element 32 and the air bag base plate 38 upon completion of the assembly process in the manner to be described further hereinafter.

As illustrated, the nest support element 30 is preferably carried on a power cylinder 40 such as an actuatable pneumatic or hydraulic cylinder as will be well know to those of skill in the art. The power cylinder 40 includes an extensible rod portion 41 so as to permit the nest support element 30 to be raised or lowered with respect to the working plate 20 as desired during the assembly process.

As shown, the folding apparatus 10 includes a holding fixture 42 to which the air bag base plate 38 may be attached prior to the folding operation such that an inflatable air bag cushion 44 operatively connected to the base plate 38 extends away from the holding fixture 42 and towards the nest support element 30. According to one potentially preferred practice, the air bag cushion 44 is attached to the base plate 38 such that a gas accepting mouth opening within the air bag cushion 44 is in substantial alignment with a corresponding opening within the base plate 38 in a manner as will be well known to those of skill in the art prior to attachment to the holding fixture 42.

The holding fixture 42 is preferably of a generally annular configuration including a passageway 43 arranged substantially in alignment with the opening in the air bag base plate 38 and the corresponding mouth opening in the air bag cushion 44. As shown, an extensible vacuum and/or pressure applying ram cylinder 45 is carried within the passageway 43 for introduction into the air bag cushion 44 during the folding operation. In the event that the base plate 38 is formed of steel or other magnetizeable material, the air bag cushion 44 and attached base plate 38 are preferably held in place against the holding fixture 42 in a releasable manner by electromagnetic force. In the event that the base plate 38 is not magnetizeable, an arrangement of retractable hook elements may be arranged circumferentially around the opening within the base plate 38 although other releasable attachment structures such as a ring of retractable ball bearings or the like as will be well known to those of in the art may likewise be utilized if desired.

Figure 2:
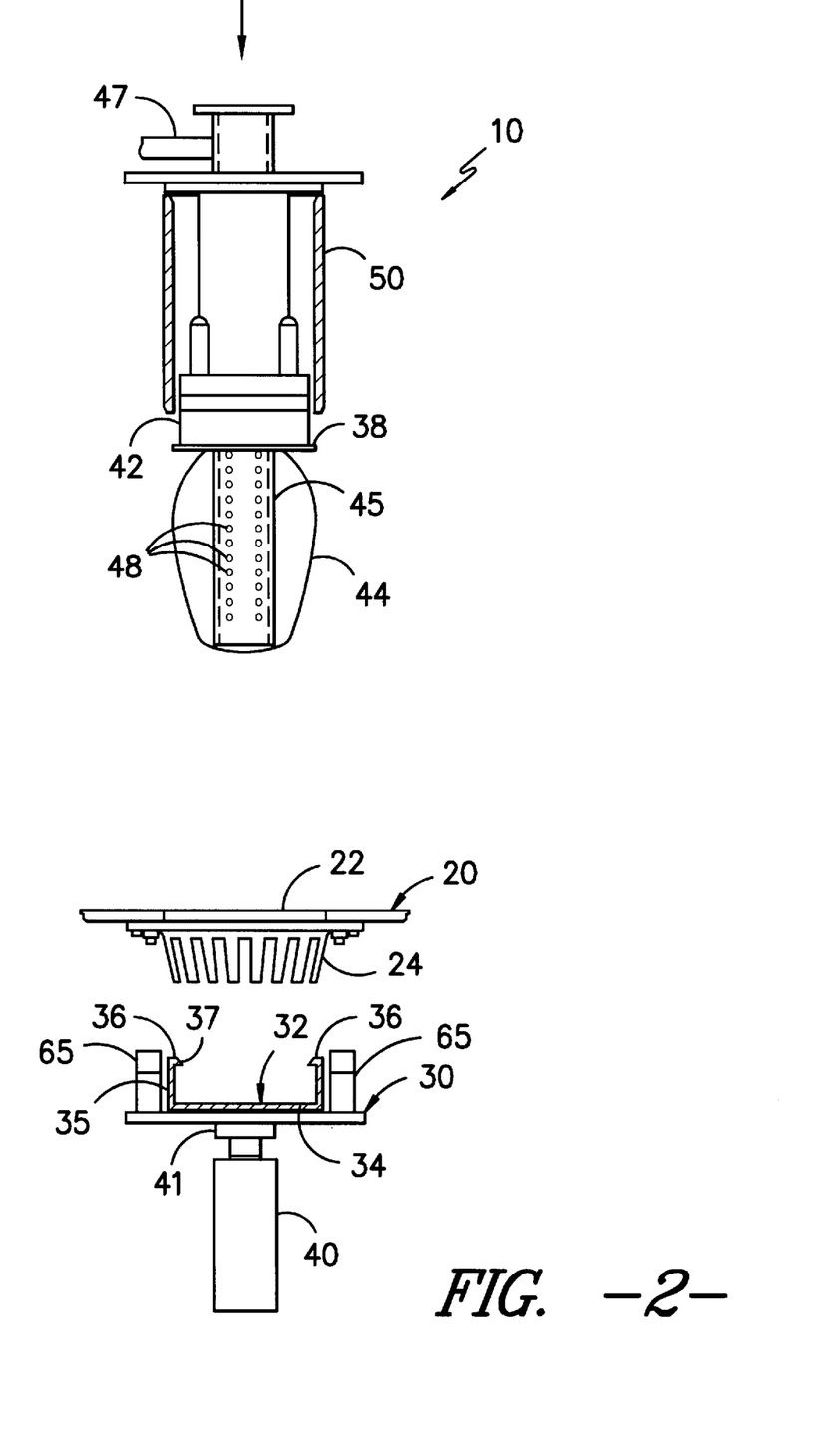
FIG. 2 is a view similar to FIG. 1 wherein a vacuum and/or pressure applying ram cylinder is extended into the air bag cushion to apply tension across a closed end of the air bag cushion.

Turning now to FIG. 2, in a preliminary stage of the folding operation, the ram cylinder 45 may be lowered through the opening within the base plate 38 and into the interior of the air bag cushion 44. If desired, the ram cylinder 45 may be extended against the opposing closed end of the air bag cushion 44 so as to place the air bag cushion 44 under a degree of tension thereby pulling the sides of the air bag cushion inwardly towards the ram cylinder 45. Such a tensioning procedure may provide some advantage in arranging the material forming the air bag cushion 44 in a substantially regular arrangement around the ram cylinder 45.

Figure 3:
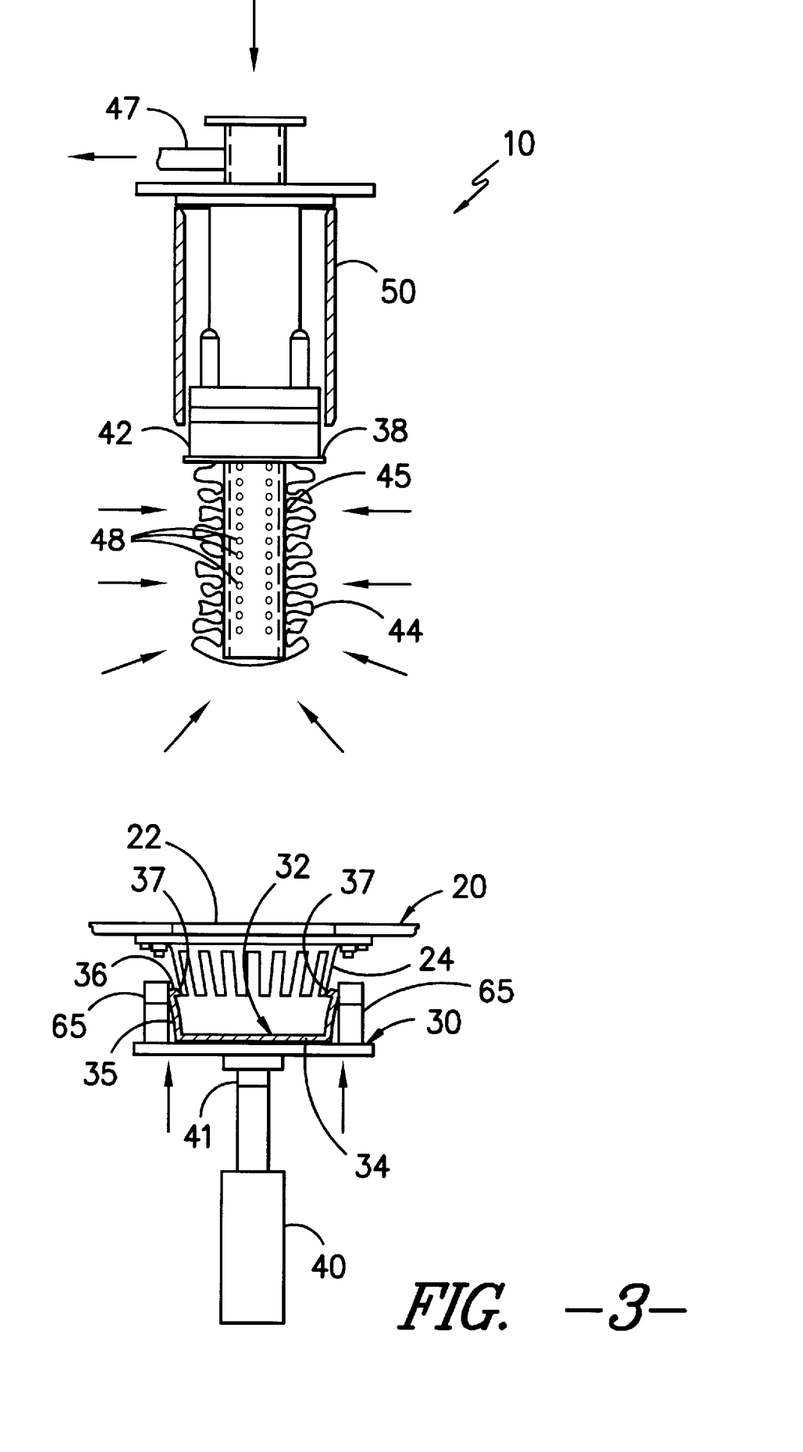
FIG. 3 is a view similar to FIG. 2 upon application of a vacuum by the ram cylinder within the air bag cushion and elevation of the cover element into preliminary engagement with a working plate guide element.

Turning to FIG. 3, once the ram cylinder 45 has been lowered into the air bag cushion 44 a vacuum (as illustrated by the directional arrows) may be applied to the ram cylinder 45 by a combination compressor vacuum pump or other appropriate device (not shown) connected to a port 47 in fluid communication with the ram cylinder 45. The introduction of this vacuum force is represented graphically in FIG. 9 between the origin and time $T_1$. The vacuum force is applied to the interior of the air bag cushion 44 by a multiplicity of openings 48 arranged along the ram cylinder 45.

As further illustrated in FIG. 3, the nest support element 30 is raised towards the working plate 20 to a position such that the fingers of the guide channel element 24 engage and slightly spread the upper region of the wall portions 35 towards nest containment walls 65 which preferably substantially surround the cover element 32. The nest containment walls 65 may be moved towards and away from the cover element by motors or force applying elements such as pneumatic and hydraulic cylinders (not shown) so as to provide a desired degree of support to the wall portions 35 during the folding operation. As will be appreciated, the spreading of the wall portions 35 facilitates proper alignment and promotes the ability to inset elements into the cover element 32 without obstruction as described further hereinafter.

Figure 4:
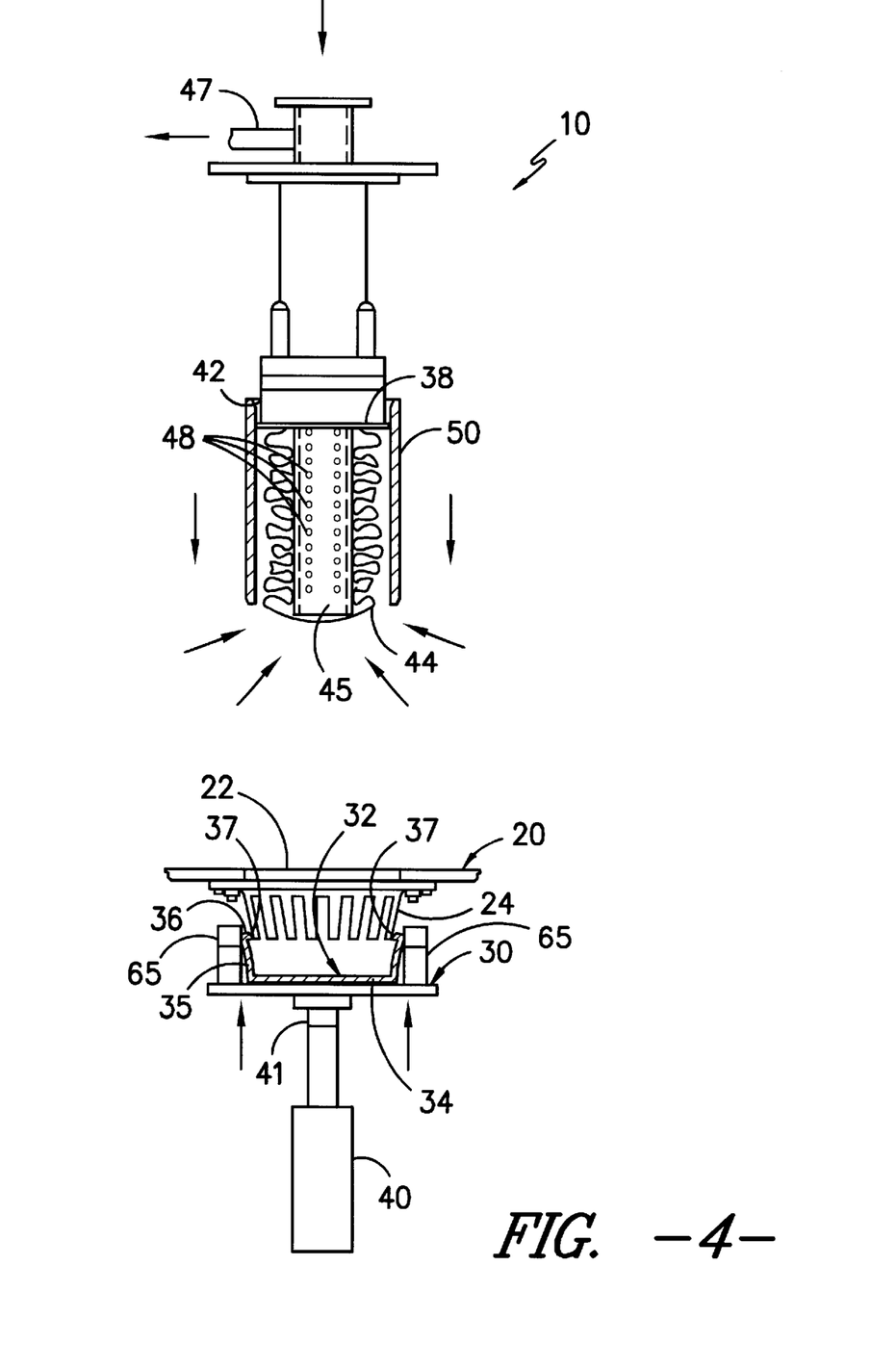
FIG. 4 is a view similar to FIG. 3 wherein a moveable containment tunnel has been passed over the air bag holding fixture and into a surrounding relation to the air bag cushion.

The folding apparatus 10 preferably includes a moveable containment tunnel 50 in the form of a rodless cylinder mounted in sleeve-like arrangement in a travel path extending circumferentially around the holding fixture 42 so as to define a containment structure around the extended ram cylinder 45 and air bag cushion 44. According to the potentially preferred embodiment, the internal dimensions of the containment tunnel 50 substantially match the perimeter dimensions of the base plate 38. Accordingly, the containment tunnel 50 provides a boundary to facilitate controlled passage of the holding fixture 42 and base plate 38 towards the cover, while at the same time aiding in the containment of the air bag cushion 44 during the folding operation.

Figure 5:
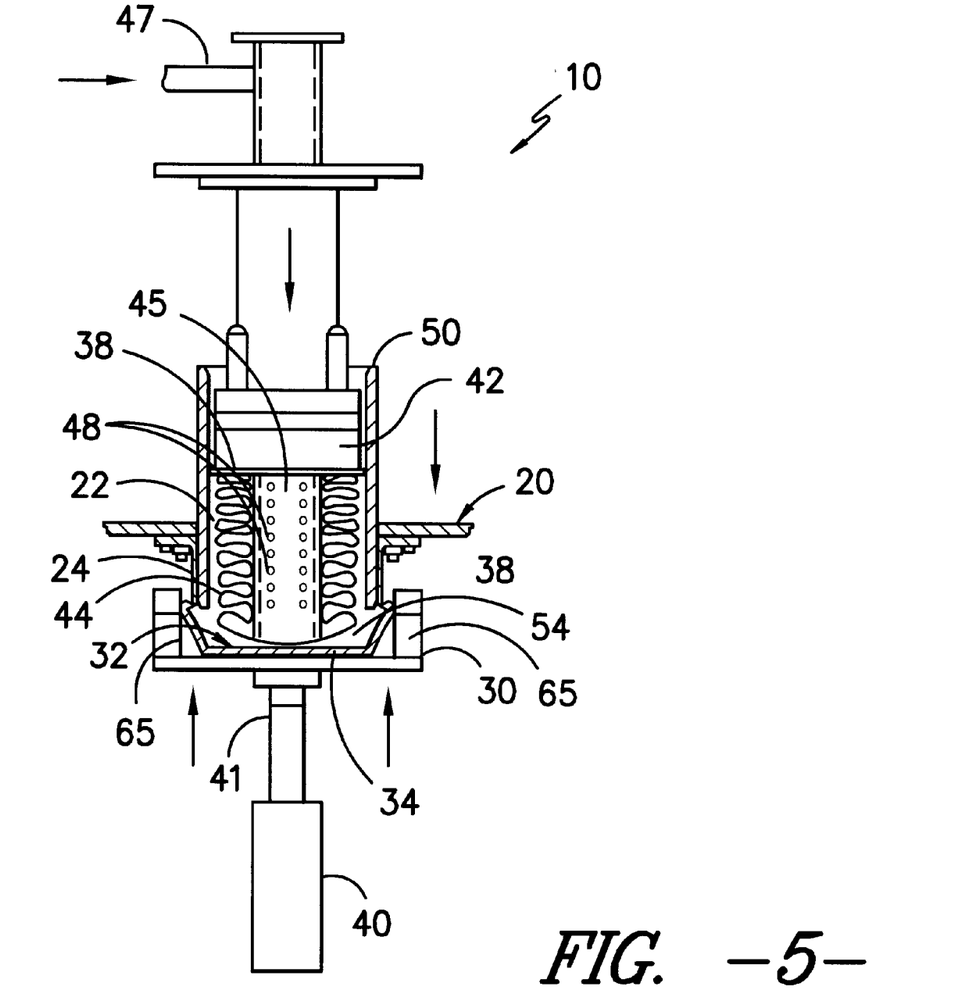
FIG. 5 is a view similar to FIG. 4 upon movement of the air bag cushion and base plate holding assembly and containment tunnel towards the air bag cover for initiation of compaction of the air bag cushion within the cover element.

As illustrated in FIG. 5, both the containment tunnel 50 and the holding fixture 42 with extended ram cylinder 45 are moveable towards the air bag cover element 32 within the nest support element 30. In this regard, it is contemplated that the holding fixture 42 may be moved up and down in relation to the working plate 20 by a servo motor (not shown) or other driving element as will be known to those of skill in the art. As illustrated, the dimensions of the working plate opening 22 are preferably such that at least the lower portion of the containment tunnel 50 may pass through the opening 22 so as to establish a contained passageway across the working plate 20 for substantially unobstructed travel by the holding fixture 42 and the base plate 38 towards the air bag cover element 32.

As illustrated, upon passage of the containment tunnel 50 through the working plate opening 22, the fingers of the guide channel element 24 are caused to spread to a substantially vertical orientation corresponding to the outer dimensions of the containment tunnel 50. The lower portion of the containment tunnel thereafter provides internal spreading support to the upper part of the wall portion 35 of the cover element 32 thereby providing a smooth support surface of proper dimensions for insertion of the holding fixture 42 with attached base plate 38 and air bag cushion 44 therethrough during compaction of the air bag cushion within the cover element 32.

As shown in FIG. 5, at the commencement of the compaction process, the ram cylinder 45 is preferably carried to the base portion 34 of the cover element 32 such that only a thin portion of material forming the air bag cushion 44 is placed against the base portion 34 of the air bag covering 32 at the center of the covering 32 generally opposing the opening within the base plate 38. The accumulation of material within the air bag cover 32 thereafter preferably takes place substantially around this central location as the holding fixture 42 is lowered and the ram cylinder 45 simultaneously retreats back into the holding fixture so as to build a substantially annular accumulation of fabric or other material forming the air bag cushion 44 within the covering 32.

According to one potentially preferred practice, at the commencement of the compaction process, the vacuum through the ram cylinder 45 may be terminated and may be replaced by either atmospheric pressure or by an elevated pressure introduced through the port 47 connected to a combination vacuum pump compressor. The termination of the vacuum may be useful in obtaining a spreading of the air bag cushion 44 towards the outer boundaries of the cover element 32 and away from the ram cylinder 45 at least at the initial stages of compaction. The replacement of a vacuum force with a pressurizing force is illustrated graphically in FIG. 9 over the time period $T_1$ to $T_2$. Of course, it is also contemplated that a vacuum force may be maintained throughout the folding operation if desired.

Figure 6:
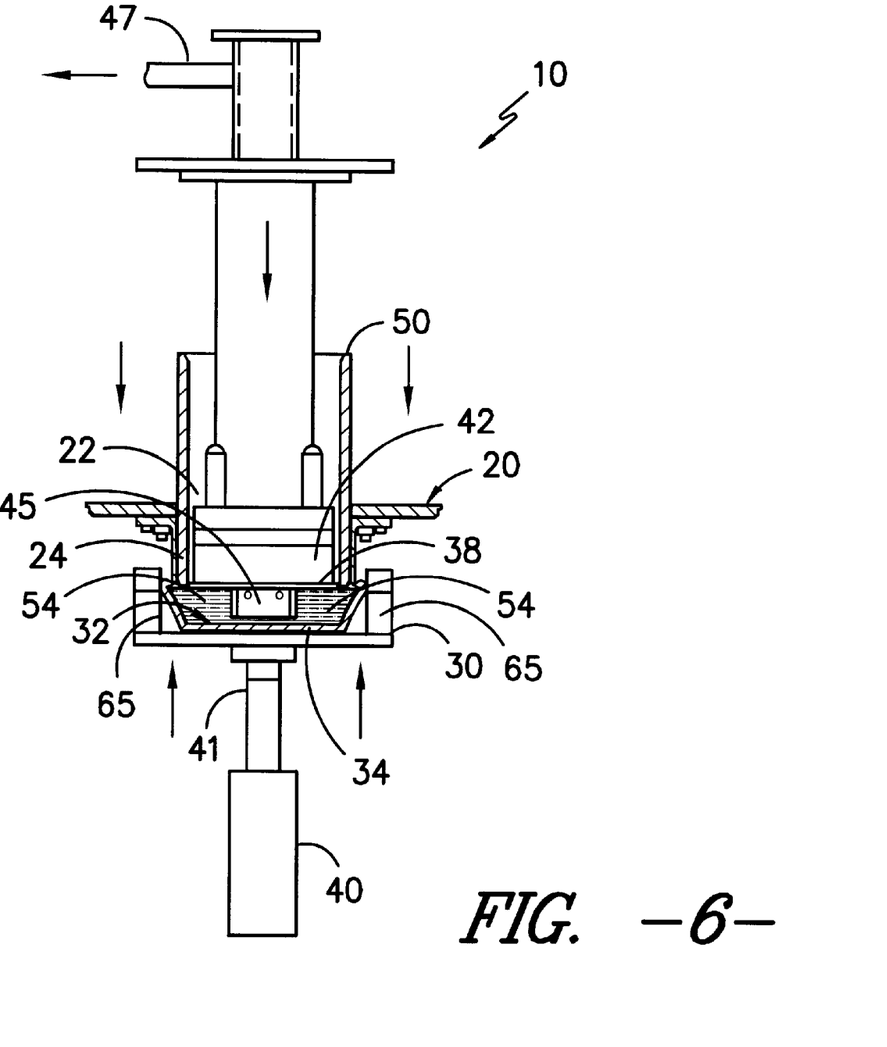
FIG. 6 is a view similar to FIG. 5 upon further passage of the air bag cushion and base plate holding fixture through the containment tunnel and illustrating chaotic folding of the air bag cushion around the ram cylinder within the air bag cover element.
Figure 9:
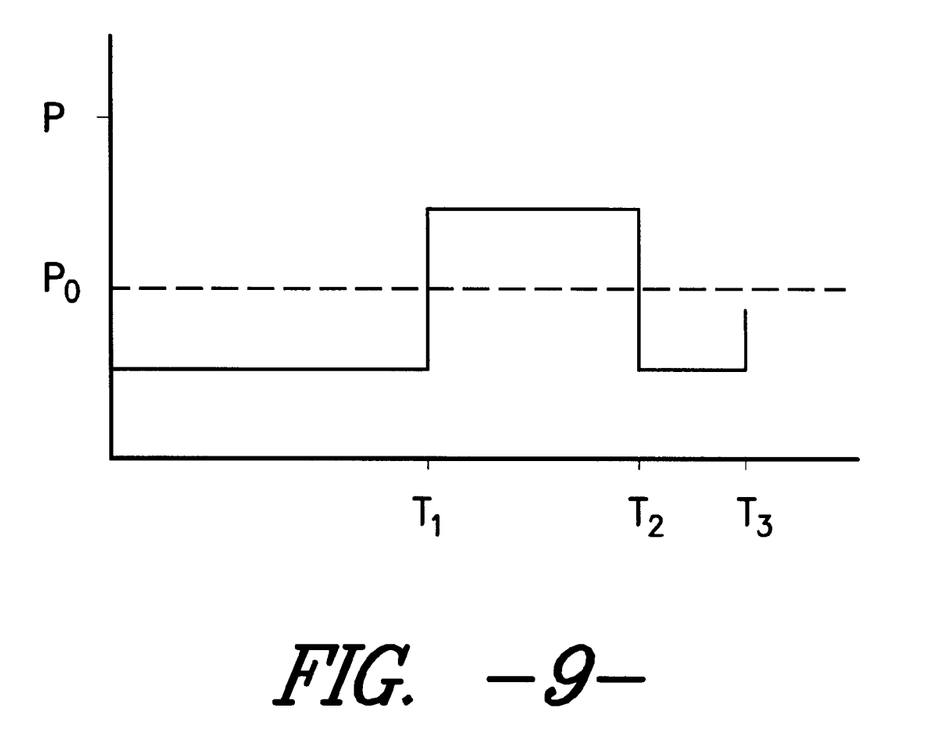
FIG. 9 is a graphical representation of one exemplary vacuum and pressure application cycle within the air bag cushion during the folding procedure.

As best illustrated in FIG. 6, upon the continued passage of the holding fixture 42 and affixed base plate 38 through the containment tunnel 50, the material forming the air bag cushion 44 collects in an accumulation of chaotic folds 54 around the ram cylinder 45. Simultaneously, the ram cylinder is compressed away from its the extended position while nonetheless remaining seated against the base portion 34 of the air bag covering 32. As the compaction nears completion a vacuum force may be reapplied as shown in FIG. 6 so as to pull the chaotic folds 54 inwardly within the boundaries of the air bag covering 32. Such reapplication of vacuum force at the latter stages of folding is illustrated graphically in FIG. 9 over the period $T_2$ to $T_3$. It is of course to be understood that FIG. 9 is illustrative only and that the periods of vacuum and/or pressure application may be of widely varying duration.

Figure 7:
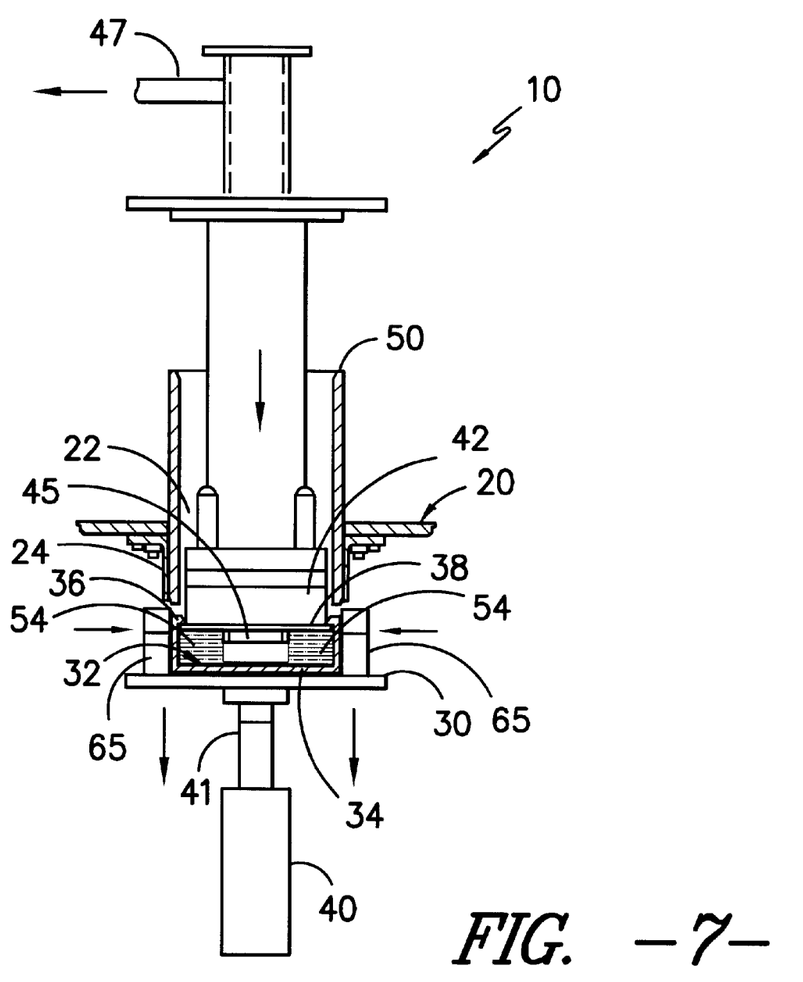
FIG. 7 is a view similar to FIG. 6 upon still further passage of the base plate holding fixture through the containment tunnel pushing the nest support away from the containment tunnel permitting attachment of the cover element to the base plate.
Figure 8:
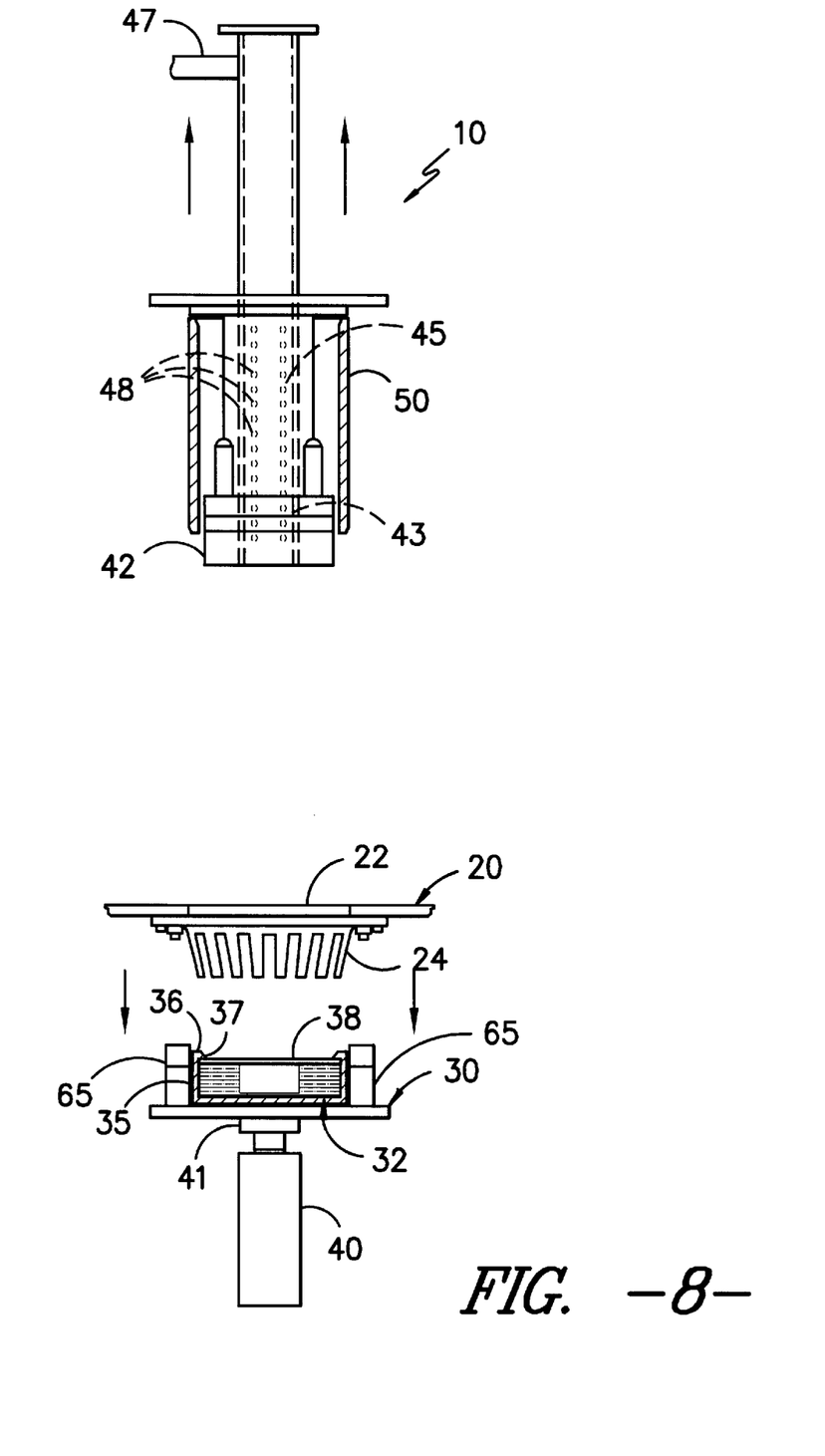
FIG. 8 is a view similar to FIG. 7 following the release of the air bag cushion and base plate from the holding fixture and withdrawal of the holding fixture and containment tunnel away from the air bag cover.

As illustrated in FIG. 7, at the final stage of compaction, the nest support 30 is preferably moved slightly away from the containment tunnel thereby permitting the hook elements 36 at the wall portion 35 of the air bag covering to be pushed over the edges of the base plate 38 by the nest containment walls 65. As shown in FIG. 8, the base plate 38 may thereafter be released from the holding fixture 42 after which the holding fixture 42 and containment tunnel 50 may be conveyed back to an initial starting position. Likewise, the nest support element 30 may be withdrawn away from the working plate 20 to permit the application of a circumferential holding ring element over the hook elements so as to hold the packed components in position once pressure is removed from the nest containment walls. The process may thereafter be repeated to effect compaction of a subsequent air bag cushion within another air bag cover.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefore intended that the present invention shall extend to all such modifications and variations which incorporate the broad aspects of the present invention within the full spirit and scope of the following claims and all equivalents thereto.

What is claimed is:

1. A method for compacting an inflatable air bag cushion within an air bag module cover element having a base portion and a wall portion extending away from the base portion, the air bag cushion having an interior, a mouth opening and a closed end in opposed relation to the mouth opening and wherein the air bag cushion is attached to a base plate disposed in surrounding relation to the mouth opening, the method comprising:

fastening the base plate at a moveable balding fixture;

extending a ram cylinder through an opening in the holding fixture and into the air bag cushion;

applying a vacuum force within the air bag cushion through the ram cylinder such that the air bag cushion is collected around the ram cylinder when the ram cylinder is disposed in extended relation within the air bag cushion;

passing a moveable containment tunnel in substantially surrounding relation over at least a portion of the air bag cushion; and     conveying the holding fixture and ram cylinder through the moveable containment tunnel and towards the base portion of the cover element such that the air bag cushion is pressed together irregularly within a region disposed around the ram cylinder and bounded by the wall portion of the cover element.

2. The method in accordance with claim 1, wherein the ram cylinder is extended against the closed end of the air bag cushion such that the air bag cushion is placed in tension along an elongate axis prior to being introduced into the cover element.

3. The method in accordance with claim 2, wherein contact is maintained between the ram cylinder and the closed end of the air bag cushion as the air bag cushion is pressed within the cover element.

4. The method in accordance with claim 1, wherein the wall portion of the cover element includes a plurality of hook elements adapted to be passed over the base plate upon pressing the air bag cushion into the cover element.

5. The method in accordance with claim 1, wherein in the fastening step the base plate is fastened at the moveable holding fixture by magnetic attraction.

6. The method in accordance with claim 1, wherein application of the vacuum force within the air bag cushion is terminated for a period of time as the air bag cushion is pressed within the cover element.

7. The method in accordance with claim 6, wherein application of the vacuum force within the air bag cushion is reinitiated following a period of termination.

8. The method in accordance with claim 1, wherein application of the vacuum force is terminated and replaced by a pressurizing force for a period of time as the air bag cushion is pressed within the cover element.

9. The method in accordance with claim 8, wherein application of the vacuum force within the air bag cushion is reinitiated following application of the pressurizing force.

10. A method for compacting an inflatable air bag cushion within an airbag module cover element having a base portion and a wall portion extending away from the base portion, the air bag cushion having an interior, a mouth opening and a closed end in opposed relation to the mouth opening and wherein the air bag cushion is attached to a base plate disposed in surrounding relation to the mouth opening, the method comprising:

fastening the base plate at a moveable holding fixture;

extending a tensioning ram cylinder through an opening in the holding fixture and into the air bag cushion;

applying a vacuum force within the air bag cushion through the ram cylinder such that the air bag cushion is collected around the ram cylinder when the ram cylinder is disposed in extended relation within the air bag cushion;

passing a moveable containment tunnel towards the cover element such that the containment tunnel defines a bounded passageway between the holding fixture and the cover element;

conveying the holding fixture and the ram cylinder through the containment tunnel and towards the base portion of the cover element thereby compressing the air bag cushion within the cover element;

replacing the vacuum force with a pressurizing force for a period of time as the air bag cushion is pressed together within a region disposed around the ram cylinder and bounded by the wall portion of the cover element; and reapplying the vacuum force following application of the pressurizing force as the air bag cushion is pressed further into the cover element.

\* \* \* \* \*